Feb. 12, 1957 W. F. FULK 2,780,889
METHOD AND APPARATUS FOR MACHINE FOLIATED GLASS
Filed Aug. 29, 1955 3 Sheets-Sheet 2
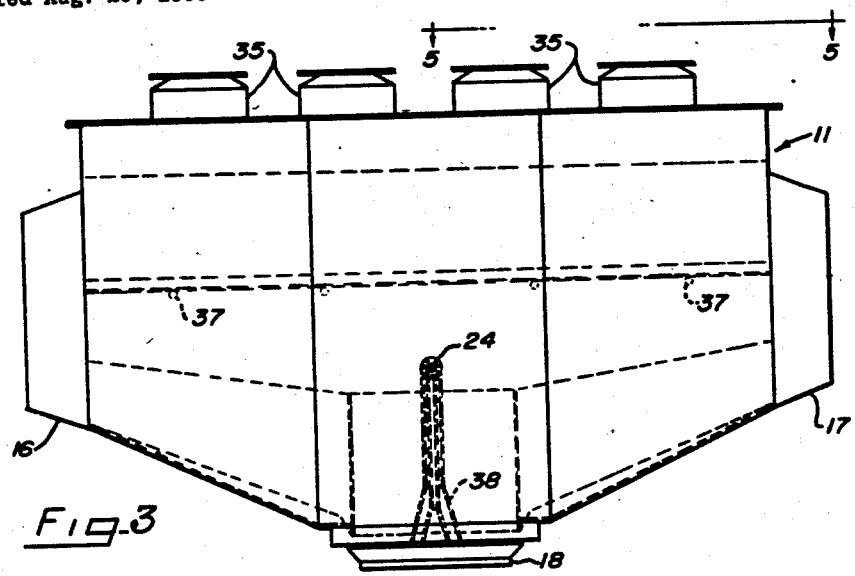
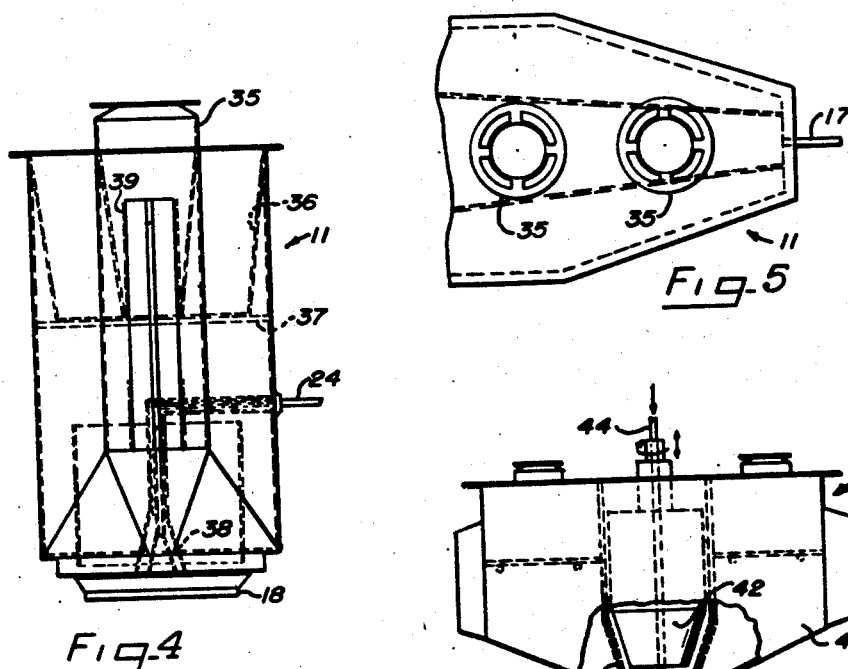
INVENTOR.
WALTER FRANK FULK
BY
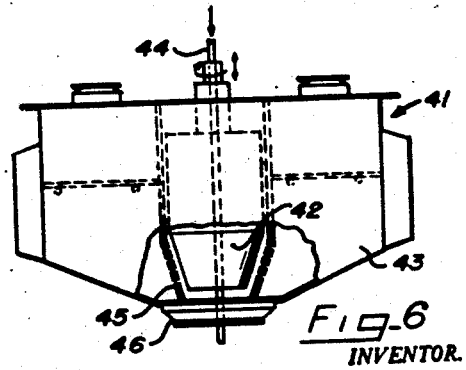
ATTORNEYS Feb. 12, 1957   W. F. FULK   2,780,889
METHOD AND APPARATUS FOR MACHINE FOLIATED GLASS
Filed Aug. 29, 1955   3 Sheets-Sheet 3

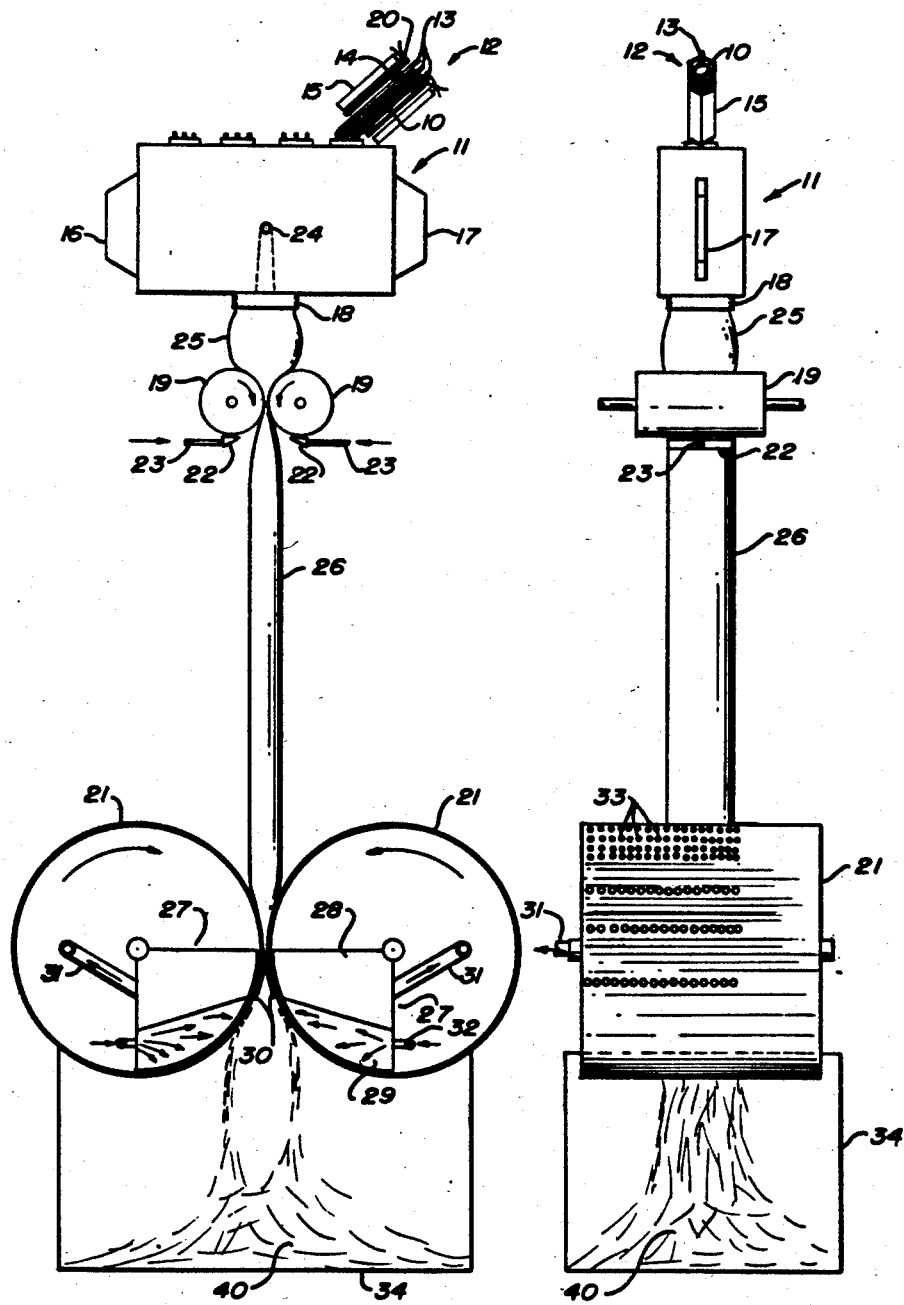

INVENTOR.
WALTER FRANK FULK
BY
ATTORNEYS

United States Patent Office 2,780,889
Patented Feb. 12, 1957

2,780,889

METHOD AND APPARATUS FOR MAKING FOLIATED GLASS

Walter Frank Fulk, Newark, Ohio, assignor to Owens-Corning Fiberglas Corporation, a corporation of Delaware Application August 29, 1955, Serial No. 531,153

10 Claims. (Cl. 49—1)

This invention relates to glass film or foliated glass in the form of flakes and to improved methods and apparatus for producing these materials.

Glass film and flake has been produced formerly and used for producing laminates and as reinforcement for resinous materials. Apparatus for producing film was disclosed in U. S. Patent 2,457,785, issued to Slayter and Snow on December 28, 1948. This apparatus produced flat, double thickness films by collapsing a cylinder of glass which was attenuated into a thin walled structure at forming. The walls of the flattened tube adhered firmly together which was beneficial according to the teaching at that time since each side of the double thickness film reinforced the other. This was believed to be especially desirable when films of glass were used in making laminated materials. These double thickness films were laminated by coating them with a suitable varnish and plying them into a laminate of the desired thickness. The double thickness films were also broken into flakes by chopping or ball milling. The flakes remained as double thickness structures regardless of the violence of the breaking action. The reason that the films remain as double thickness structures is because of the adhering qualities of the clean glass as formed. No water film or contaminating film could coat the inner side of the tube which was being attenuated; therefore, those inner walls adhered strongly together.

It has been found desirable to have single thickness film and flake for producing reinforcing materials for resin, rubber, asphalt, Portland cement, and the like; therefore, it is an object of this invention to provide a method and apparatus for the production of single thickness film and flake.

It is an object to provide an improved, interruption-free method of producing uniform film and flake glass at high production rates.

It is a further object to provide individual flakes of glass, the nascent surfaces of which are especially adapted for coupling with other materials to form reinforced products.

It is a further object to provide improved reinforcing materials of foliated glass.

The process comprises forming a cylinder of molten glass, maintaining a slight positive pressure within the cylinder as it is being formed, attenuating the cylinder of molten glass into a thin walled structure, substantially collapsing the cylinder of glass, allowing the cylinder of glass to expand a second time, and then separating the cylinder into two distinct single thickness films of glass. These single thickness films of glass are then either rolled up as film or broken into flakes as may be desired.

The invention will be better understood by reference to the drawings, in which:

Figure 1 is a side elevational view of apparatus used in producing flakes of glass;

Figure 2 is a front elevational view of the same apparatus;

Figure 3 is a front elevational view of a glass melter used in conjunction with the apparatus shown in Figures 1 and 2;

Figure 4 is a side elevational view of the glass melter;

Figure 5 is a top view on line 5—5 of Figure 3;

Figure 6 is a side elevational view partly broken away of another embodiment of a glass melter;

Figure 7:
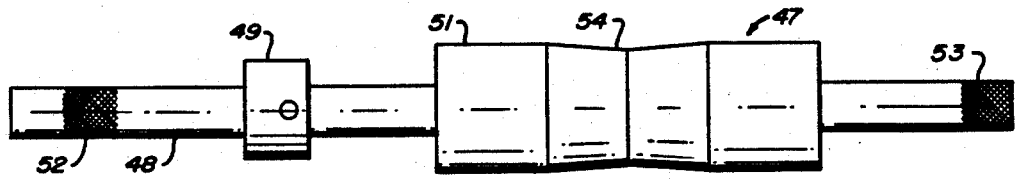
Figure 7 is a view of a collapsing roll.

The apparatus shown in Figures 1 and 2 comprises a glass melter 11 which is suitable for melting glass marbles or cullet. The marbles are introduced through a marble chute 12 which comprises a group of generally parallel rods 13, 13 held together by one or more bands 14. Marble chute 12 is provided with an electrical resistance heater 15. The glass melter 11 has electrical terminals 16 and 17 to which a suitable source of electrical energy is supplied for heating the melter. At the bottom of the glass melter 11 is an annular orifice 18 through which molten glass flows in the form of a cylinder of glass 25. Disposed below the annular orifice 18 is a pair of coacting pull rolls 19, 19 which are adapted for collapsing the cylinder of glass and advancing the collapsed cylinder toward suction rolls 21, 21. These pull rolls 19, 19 may be driven by one or two electric motors as desired.

Immediately below pull rolls 19, 19 are disposed a pair of air knives 22, 22 to which low pressure air is supplied through air inlets 23, 23 to stabilize the advancing ribbon of glass 26. Air is introduced through air knives 22, 22 to stabilize the ribbon of glass as it passes downwardly to the suction rolls 21, 21. The ribbon of glass tends to waver as it passes through the air between the sets of rolls. The air from air knives controls the ribbon of glass and markedly reduces the wavering of the ribbon as it passes downwardly to the suction rolls. This added control makes it possible to provide interruption-free production of highly uniform flake never heretofore possible.

An air inlet 24 is provided for glass melter 11, through which low pressure air is supplied to the inner side of the cylinder of glass 25. The air introduced through inlet 24 tends to balloon the cylinder of glass 25 and then passes down between pulling rolls 19, 19 and causes a secondary ballooning of the ribbon of glass 26.

Pull rolls 19, 19 are spaced apart so that air can pass from the cylinder of glass 25 downwardly into the ribbon of glass 26 which is thereby inflated as shown. A low volume of air passes through these paths since suction rolls 21, 21, which are disposed below pull rolls 19, 19, are placed substantially one against the other. Enough pressure is maintained on air inlet 24 so that the cylinder of glass 25 does not collapse due to atmospheric pressure and, in fact, slightly balloons as does the ribbon of glass, see Figure 1. The cylinder of glass 25 is attenuated by the action of pull rolls 19, 19. The wall thickness of the cylinder of glass is reduced substantially and the cylinder of glass is substantially flattened as it passes between pulling rolls 19, 19. The attenuation of the glass takes place very near to annular orifice 18.

Pull rolls 19, 19 are preferably constructed of cold rolled steel and are provided with an undercut surface to assure passage of air or other fluid to the slightly ballooned ribbon of glass 26. Other materials besides cold rolled steel can be used if they are adapted for withstanding the erosive effects of the hot glass being pulled. Stainless steel and various other materials may be used.

Within suction rolls 21, 21 are suction boxes 27, 27. These suction boxes are compartmented into suction chamber 28 and pressure chamber 29. Suction chamber 28 has an air line 31 which is connected to a suitable suction pump or like device. Pressure chamber 29 has an air inlet 32 to which low pressure air is directed. The periphery of the suction rolls 21, 21 is provided with a plurality of holes or perforations 33, 33 as is seen in Figure 2. Disposed below suction rolls 21, 21 is a hopper 34 for collecting the product.

The marble melter 11 is shown in more detail in Figures 3, 4, and 5. The melter is fabricated of platinum alloy sheets with welded seams. The melter is provided with four marble feed domes 35, 35 to which marble chutes are attached, only one chute being shown in Figure 2. The melter is provided with a screen basket 36 mounted on supporting rods 37, 37 which prevents unmelted glass from dropping to the bottom of the glass melter 11. The basket also tends to break up any cords or other inhomogeneities in the glass within the melter.

Above annular orifice 18 is disposed air inlet 24. Air which is introduced through air inlet 24, passes through a port which connects inlet tube 24 with an inverted funnel or cone shaped orifice 38 disposed at the center of annular orifice 18. Air is released from cone shaped orifice 38 into the inside of the molten cylinder of glass 25 flowing from annular orifice 18. Heater strips 39, 39 are positioned within the melter to act as electrical resistance units for providing localized heat in the melter.

In Figure 6 is another embodiment of a glass melter. This melter 41 is provided with a rotor which stirs the melted glass and provides a more uniform temperature throughout the melt 43. The rotor 42 is hollow so that air lines such as that designated by numeral 44, or the like may be inserted from the top of a melter down into the cylinder of glass as it is formed. The rotor is so mounted that it is free to turn upon its own axis and also to move vertically along its own axis so that the clearance between the rotor 42 and the perforated cone 45 can be adjusted as may be desired. By lowering or raising the rotor within perforated cone 45, the volume of glass passing downward through orifice 46 can be controlled.

In Figure 7 is shown a detailed view of a pulling roll 47. The pulling roll comprises a shaft 48 having a pulley hub 49 and an undercut roll 51. Bearing surfaces are indicated by numerals 52 and 53. The undercut surface 54 of pulling roll 47 matches a like cutaway portion upon an opposing roll of the pair of rolls so that a passageway is formed for the air which causes the secondary ballooning of the ribbon of glass 26.

Figure 8:
Figure 8 is an oblique view of apparatus for dispersing a powder in air, parts being broken away.

In Figure 8 is shown an air-powder mixing device 55 which is used in conjunction with pressure chambers 29, 29 of suction boxes 27, 27. The mixing device comprises a rotatable shaft 56 upon which is mounted a cylindrical screen 57 adapted for turning within cylindrical housing 58. At the top of housing 58 is an air-powder outlet 59 into which is fitted a high velocity air powder injector 61. Next to the air-powder outlet is the powder filler opening 62 through which powder is loaded. At the bottom of housing 58 are two low pressure air inlets 63, 63 which have constricting orifices therein.

Figure 9:
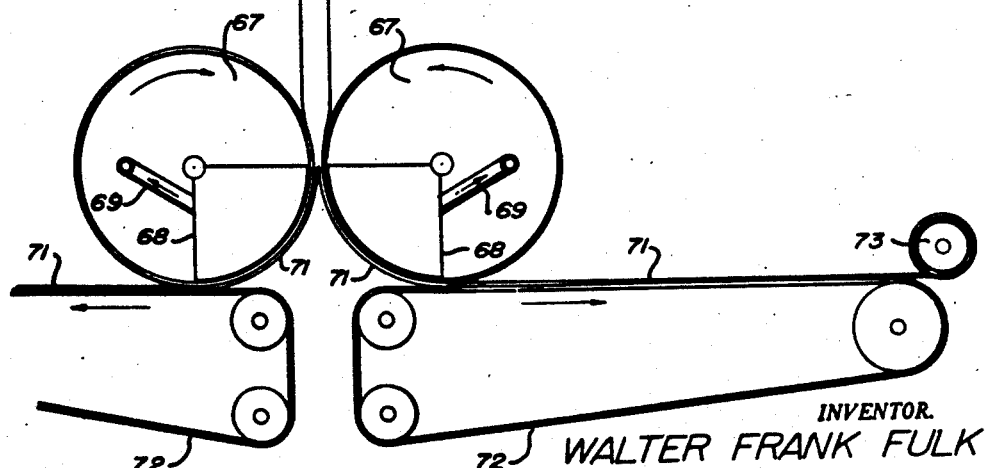
Figure 9 is a view of apparatus used in producing film.

In Figure 9 is shown another embodiment of the invention wherein cylinder of glass 64 is .tially collapsed while it is being advanced by pull rolls 65, 65 and then a secondary ballooning takes place within the ribbon of glass 66 as the ribbon proceeds toward suction rolls 67, 67. The pull rolls and suction rolls in Figure 9 are similar to those shown in Figures 1 and 2. Within suction rolls 67, 67 are suction boxes 68, 68 which are provided with outlet lines 69, 69 connected to a suitable suction device not shown. Ribbon of glass 66 is divided and a single thickness film 71 passes a quarter of the way around suction rolls 67 and is then deposited upon conveyor belt 72. The conveyor belts may be provided with suction boxes if desirable to promote retention of the film upon the belt surface. The film 71 is wrapped upon roll 73 as indicated.

In operating this apparatus current is directed through glass melter 11 through terminals 16 and 17 to bring the melter up to operating temperature. Current is also supplied to terminals 20, 20 of heaters 15, 15 to preheat the marbles in the marble chute 12 before the marbles are introduced into the glass melter 11. The marbles are heated to about 300° to 350° F. before being introduced to the melter. Glass flows in the form of a hollow cylinder from orifice 18 due to the effects of gravity. As the cylinder of glass 25 passes downwardly and approaches pulling rolls 19, 19, these rolls are set in motion and the cylinder of glass is collapsed and advanced by the action of the rolls. Air is introduced through inlet 24 so that the cylinder of glass is expanded to form a bubble as shown in Figures 1 and 2. The formation of this bubble attenuates the glass in addition to the attenuation being provided by pull rods 19, 19. As the cylinder of glass 25 is partially collapsed and advanced, a ribbon of glass 26 is formed and advanced toward suction rolls 21, 21. The air introduced through inlet 24 passes downwardly between rolls 19, 19 and separates the walls of the ribbon of glass 26 causing the ribbon to open up in a generally elliptical shape, see Figures 1 and 2. A fluid other than air may be introduced through inlet 24, if it is desirable. For instance, an inert gas may be introduced to prevent contamination of the glass surfaces so that they remain in their nascent state.

Ribbon of glass 26 is introduced between suction rolls 21, 21 after the suction rolls have commenced to rotate. A suction fan or other suitable device removes air from suction chamber 28 through air line 31. Ribbon of glass 26 is collapsed as it passes between suction rolls 21, 21 and the ribbon is split at its outer edges by the separation of the suction roll peripheries to form two films, one film following the surface of each of the two suction rolls. The film 30 follows the surface of the suction roll until the film approaches or reaches pressure chambers 29, 29 whereupon the film is broken into small flakes 40, 40 which drop downwardly into hopper 34. Individual flakes of glass are formed and then deposited in hopper 34.

Figure 10:
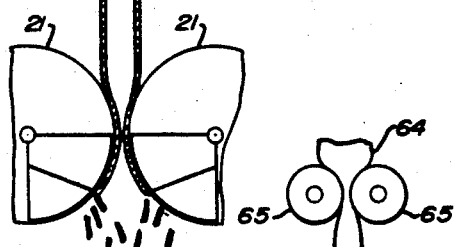
Figure 10 is a schematic view, partly exaggerated, showing relationship of pulling rolls one to another and suction rolls one to another.

The relationship of the pull rolls one with the other and their relationship with the cylinder of glass, the ribbon of glass and the suction rolls is best shown in Figure 10. This schematic view clearly shows that the pull rolls 19, 19 are spaced apart so that the opposed walls 50, 50 of the partially collapsed cylinder of glass 25 do not actually touch one another. The ribbon of glass 26 then balloons between the pull rolls 19, 19 and the suction rolls 21, 21. The opposed walls of the ribbon are brought very close to one another as the ribbon passes between the suction rolls; however, it is preferable that the walls do not actually contact one another with the result that the nascent surfaces adhere one to the other. It is preferred that the surfaces do not adhere because single thickness flakes have advantages utilized in resin and glass combinations. It will be noted that the opposed walls of the partially collapsed cylinder of glass as it passes between pull rolls 19, 19 are spaced further apart than the opposed walls of the collapsed ribbon of glass as it passes between suction rolls 21, 21. This relationship causes a pressure to build up within the ribbon of glass 26 to assure the secondary ballooning desired.

It has been found advantageous to provide powder dispersed in air for covering the surfaces of the flakes of glass as they are formed in order to assure that the flakes remain as individual flakes and to prevent adherence of adjacent flakes one to another due to their nascent surfaces. This is especially true if the flakes are to be packaged and shipped to an ultimate consumer. On the other hand, if the nascent surfaces of the flakes are to be combined with a second material such as a resin in the production of a reinforced resin, then it is advantageous to introduce no powder but rather to allow the flakes to drop downwardly into a tank containing the resin where they will be intimately mixed with the resin. The resin and flake mixture then can be molded or extruded or formed in any suitable manner.

The powder is dispersed in air with an apparatus such as that shown in Figure 8. The powder is introduced into the air-powder mixing device 55 through filler opening 62 which is then closed. High pressure air is introduced through inlet 60 into high velocity air injector 61. Shaft 56 is commenced to rotate and low pressure air is introduced through inlets 63, 63 into the mixing device. The powder is tumbled by the rotation of the cylindrical screen and is thereby intimately mixed with the low pressure air introduced through 63, 63. This air dispersed powder is then drawn from the mixing device through outlet 59 by the action of high velocity air injector 61. The powder in the high velocity air is directed through inlet 32, 32 into pressure chambers 29, 29, see Figure 1.

Various powders may be used; for instance, talc or hydrophobic silica may be used. Other suitable powder may be used including such materials as powdered rosin, rouge, soap stone, powdered resinous materials such as the vinyl polymers or the like, and many others. It is particularly advantageous to apply a powder which is compatible with any material that the flake is to be combined with. If the flakes are to be used in reinforcing vinyl polymers, it is well to use unplasticized, powdered vinyl chloride or a copolymer of vinyl chloride and vinylidine chloride or the like.

Powdered materials likewise can be introduced into the air which is directed into the cylinder of glass being attenuated. By introducing treating materials into the cylinder of glass, the reaction of the treating composition with the nascent surfaces of the glass at the inside of the cylinder of glass is assured. However, with this "double bubble" process it is not absolutely necessary to introduce treating compositions into the center of the cylinder of glass being attenuated since the walls of the cylinder remain spaced apart until the individual flakes are actually formed. If it is desirable to add no treating compositions, the "double bubble" process is especially advantageous over former processes where the walls of the cylinder were brought together and adhered tightly one to the other.

In operating the apparatus shown in Figure 9, cylinder of glass 64 is directed between spaced apart pull rolls 65, 65 and the ribbon of glass 66 then is passed between suction rolls 67, 67. Air is removed from suction chambers 68, 68 through outlet lines 69, 69. The ribbon of glass 66 is split into two discrete films of glass, one of which adheres to each of the peripheries of suction rolls 67, 67. One side of the ribbon passes around the right suction roll and the other half of the split ribbon passes around the left suction roll. After the ribbon passes the suction chamber region, it is deposited upon the conveyor 72 which is rotating as indicated by the arrows in Figure 9. The rolls of film are formed by winding the film from the conveyor onto a suitable drum or mandrel 73. If desirable, one of the suction boxes is provided with a plenum chamber so that flake will be produced of one film while the other film is wrapped on a roll as a continuous sheet of film. This is accomplished by applying low pressure air as with pressure chamber 29 to one suction roll, removing the conveyor belt and collecting the flake in a hopper. Such an arrangement is desirable when both flake and film are to be introduced into a reinforced resin product. The film from one suction roll is laminated with resin and the flake of the other suction roll is directed onto the surface of the laminate to create desirable surface effects.

The glass in the cylinder being attenuated is believed to be worked in two directions. This results from the expansion of the cylinder of glass at the same time that it is being pulled and attenuated downwardly. The balloon formed by introduction of low pressure air into the center of the cylinder of glass expands the glass outwardly into a large sphere while simultaneously the pull rolls attenuate the glass by pulling downwardly. This two direction working is believed to impart unusual strength to the resulting glass film. The working of the glass in such a manner orients the micells or microstructure of the glass so as to orient the micells laterally as well as longitudinally. The strength imparted to the film by such two direction working remains in the flake after the film is broken into particles. The strength so imparted is believed to be similar to that provided in polyester resin films and the like.

When combining the flake produced with the apparatus described with a resin such as polyester resin, it has been found that either translucent sheets or opaque sheets can be provided. If a polyester resin and flake glass member is cured at about 165° F., a translucent article is obtained. The glass is entirely invisible in such articles. On the other hand, if the temperature is increased to about 265° F. or as high as 300° F., the resin shrinks and the glass and resin separate at their interfaces making the molded article entirely opaque. The flakes of glass may be treated with a coupling agent before being combined with the resin; however, it has been found that when no coupling agent is used, the article becomes more nearly opaque as compared to an article produced from flake treated with a coupling agent such as one of the silane compounds. Resinous material such as polyvinyl chloride polymers will separate from the glass in a molded or laminated piece if the piece is worked by bending or the like. The opaqueness appears to be throughout the thickness of the material.

The flake or film produced as described may be given after treatments before being combined with resins, rubber, or the like. For instance, flake may be treated by coating with a metal. Such metal coated flake is used to enhance the opaqueness and light reflectivity of resin panels which are reinforced with such flake. The flake or film may be treated with various glass to resin coupling agents or adhesives as may be desired to provide improved composite products. Flake or film with or without after treatments may be combined with chopped fibrous glass strand for reinforcing resinous materials and the like. The fibrous glass may be in the form of loose strands or in the form of an integral mat or in any other suitable form. Likewise, continuous strand mat may be used along with flake or film in producing reinforced resin products and the like.

The uses of flake glass and films of glass are many and varied. These materials may be used to reinforce resins, rubber, cement, mastic compositions, glass, paper, or combinations of these materials. Metal coated flake is used for reinforcing resin to be used in the production of reflectors, signs, warning buttons for road ways, safety clothing, screens for movies, roof panels, and the like. Flake is also added to resin articles for added strength and improved electrical properties. In addition, heat resistance is provided by the introduction of flake into resins. Flake is introduced into gel coatings for surfacing reinforced plastic articles in order to provide opaqueness for the surface. When flakes of glass are used to reinforce resin in the body of a molded piece or the like, the proportions of glass may be from 20 to 80% of the total by weight. When flake is used in the surface as in a gel coating on a molded plastic part, the proportion of glass will normally be from about 3 to 5% of the total weight. It has been found that much higher loading of glass in resin is possible with flake or film as compared to strand.

Flake is used to reinforce gypsum products and Portland cement and the like in order to provide additional strength. Flakes of glass also are used for reinforcing paper. The flakes are added to the paper slurry and thoroughly mixed with the pulp or cellulose fibers to make a heat resistant and high strength product.

Various modifications may be made within the spirit and scope of the appended claims.

I claim:

1. Method of producing discrete particles of glass comprising providing a supply of molten glass, flowing glass from said supply in the form of a hollow cylinder of molten glass, attenuating the glass in said hollow cylinder by extending the cylinder and simultaneously expanding the cylinder as a balloon, advancing the cylinder of molten glass as it is formed, collapsing said cylinder as it advances, reinflating the collapsed cylinder while continuing its advancement, splitting said cylinder at opposite sides to form two ribbons of glass and breaking these ribbons into individual flakes of glass.

2. Method of producing flake glass comprising supplying a bath of molten glass, allowing molten glass to flow from said bath in the form of a hollow cylinder, advancing said hollow cylinder and simultaneously expanding said hollow cylinder to attenuate the glass in said hollow cylinder, partially collapsing the cylinder of glass as it advances to form a double walled ribbon of glass, reinflating said ribbon of glass while continuing the advancement thereof, separating the ribbon of glass into two films of glass, and fracturing the films of glass into discrete flakes.

3. Method of producing glass comprising melting glass to form a supply thereof, allowing a stream of glass to flow from said supply in the form of a hollow cylinder, reducing the thickness of the walls of said cylinder by inflating the hollow cylinder, advancing said hollow cylinder and patrially collapsing the cylinder to form a double walled ribbon of glass, reinflating the ribbon of glass to separate the walls thereof, and splitting the ribbon of glass at opposed edges to form two discrete films of glass.

4. Method of producing glass flake comprising providing a supply of molten glass, flowing said molten glass from said supply in the form of a hollow cylinder, attenuating the glass in said hollow cylinder by inflating said hollow cylinder, advancing said hollow cylinder and progressively collapsing the cylinder of glass as it advances by forcing opposed walls of said cylinder of glass into close proximity to form a ribbon of glass, reinflating said ribbon to provide a hollow, double wall ribbon structure having a generally elliptical cross section, again collapsing the structure by forcing said opposed walls into even closer proximity, splitting the collapsed structure into two flat films, and causing said films to be broken into flakes.

5. Method of producing flakes of glass comprising providing a supply of molten glass, flowing from said supply of molten glass a hollow cylinder of glass, attenuating said hollow cylinder to effect reduction of the thickness of the walls of said cylinder, collapsing said cylinder to form a ribbon of glass, and applying suction to opposite sides of said ribbon to split said ribbon into two distinct films of glass.

6. Apparatus for producing glass comprising a molten glass receptacle provided with an annular orifice from which glass flows in the form of a continuous tube, means for introducing fluid under pressure into said tube to balloon said tube, means for advancing said tube as it is being formed and simultaneously partially collapsing said tube, and a pair of suction rolls adapted for receiving said tube and splitting said tube into two discrete films.

7. Apparatus for producing film comprising a glass melter provided with an annular orifice from which molten glass flows in the form of a continuous tube, means for introducing fluid under pressure to the inner side of said tube to balloon said tube, means for partially collapsing said tube and advancing the tube as it is being formed, a pair of coacting rolls adapted for receiving said tube, said rolls having perforations in their outer peripheries, associated with each of said rolls an individual suction box from which air is removed to cause air to flow from the outer surface of said roll through said perforations to the suction box and to cause the surfaces of said tube to adhere to the outer peripheries of said rolls, means for rotating said coacting rolls to cause said tube to be split into two distinct films, and rollup means for packaging said film.

8. Apparatus for producing foliated glass comprising a glass melter provided with an annular orifice from which molten glass flows in the form of a continuous tube, means for introducing fluid under pressure to the inner side of said tube to balloon said tube, means for partially collapsing said tube and advancing the tube as it is being formed, and splitting the tube into two distinct films, and means for breaking the film into individual platelets.

9. Apparatus for producing glass flake comprising a glass melter having an annular orifice through which molten glass flows in the form of a continuous hollow tube, means for introducing fluid under pressure to the inside of said hollow tube to balloon said hollow tube, a pair of coacting pull rolls disposed below said orifice and adapted for collapsing and advancing said hollow tube, said pull rolls being slightly spaced apart and each roll having an undercut surface which mate to form a passage for fluid within said hollow tube as it passes between said rolls, and a pair of suction rolls disposed below said pull rolls, each of said suction rolls being provided with a suction chamber and an adjacent plenum chamber, both chambers being disposed within said roll.

10. In a method of producing foliated glass comprising flowing molten glass through an orifice in the form of a hollow tube, ballooning the tube and attenuating the tube to reduce the wall thickness, and collapsing the tube to form a ribbon, the improved steps of reinflating the ribbon of glass to form a secondary balloon, applying suction to opposed faces of the inflated ribbon to separate them into two discrete films, and directing a fluid under pressure against said films to shatter said films into platelets of glass.

References Cited in the file of this patent

UNITED STATES PATENTS

| Number | Name | Date |
|---|---|---|
| 2,251,727 | Wellech et al. | Aug. 5, 1941 |
| 2,457,785 | Slayter et al. | Dec. 28, 1948 |